United States Patent [19]

Smith

[11] Patent Number: 5,964,055
[45] Date of Patent: Oct. 12, 1999

[54] FLEXIBLE NECK DECOY

[76] Inventor: William Smith, 22716 Ridgeway, Richton Park, Ill. 60471

[21] Appl. No.: 08/963,603

[22] Filed: Oct. 31, 1997

[51] Int. Cl.$^6$ ................................................. A01M 31/06
[52] U.S. Cl. .................................................................... 43/3
[58] Field of Search ................................. D22/125; 43/2, 43/3

[56] References Cited

U.S. PATENT DOCUMENTS

| | | | |
|---|---|---|---|
| D. 318,709 | 7/1991 | Osmon et al. | D22/125 |
| 2,545,800 | 3/1951 | Viken | 43/3 |
| 4,845,872 | 7/1989 | Anderson | 43/3 |
| 4,852,288 | 8/1989 | Payne et al. | 43/2 |
| 4,972,620 | 11/1990 | Boler | 43/3 |
| 5,274,942 | 1/1994 | Lanius | 43/2 |
| 5,279,063 | 1/1994 | Heiges | 43/3 |
| 5,570,531 | 11/1996 | Sroka | 43/3 |
| 5,613,317 | 3/1997 | Ninegar | 43/3 |

*Primary Examiner*—Robert P. Swiatek
*Attorney, Agent, or Firm*—Goldstein & Canino

[57] ABSTRACT

A decoy, for providing the appearance of a realistic living bird, comprising a main body, a head, and a bi-partite neck comprising an upper neck and lower neck. The upper neck adjoins the head, and lower neck adjoins the main body. A flexible member extends between the upper neck and lower neck. The flexible member comprises an upper coil spring and lower coil spring. The dual coil springs allow the head to oscillate in a complex pattern, without manual intervention, to provide the appearance of a living bird to other birds in the vicinity.

3 Claims, 1 Drawing Sheet

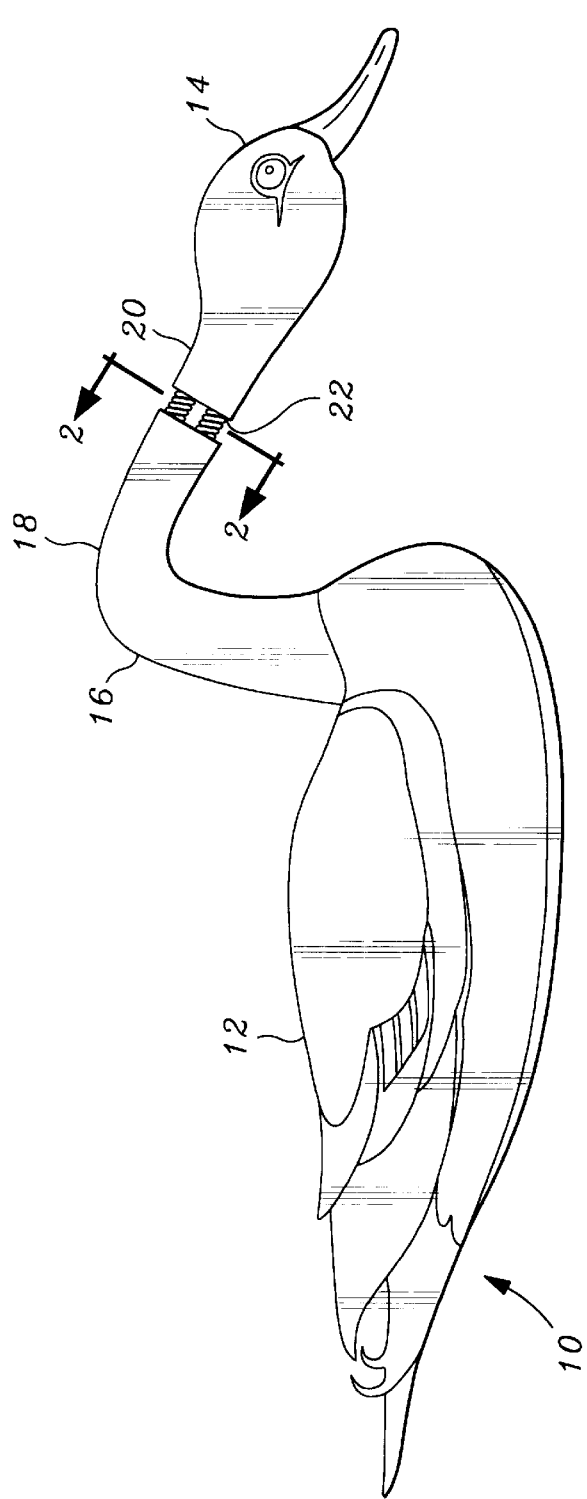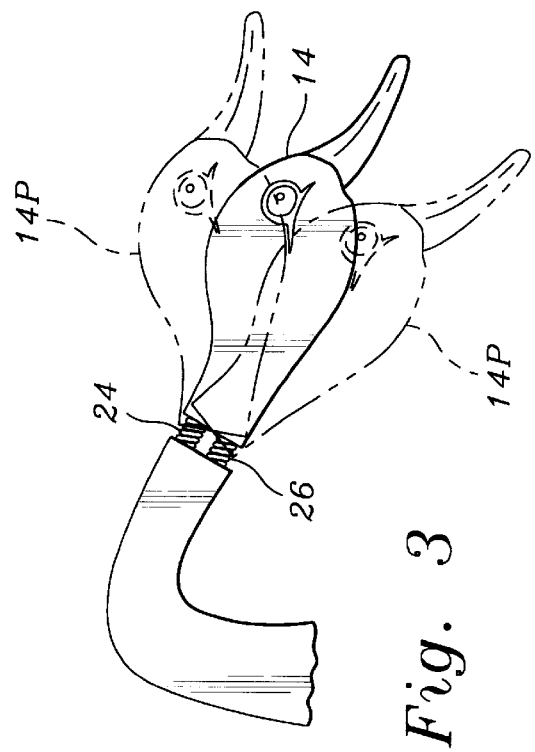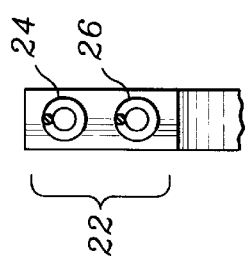

FLEXIBLE NECK DECOY

BACKGROUND OF THE INVENTION

The invention relates to a flexible neck decoy. More particularly, the invention relates to a hunting decoy, formed in the shape of a goose or other fowl, and having a neck structure which causes the head to move, giving a realistic appearance to game fowl in the vicinity of the decoy.

Fowl hunting is a sport with international appeal. Goose hunting and duck hunting are among the most popular variations. In these sports, decoys are typically employed to attract fowl. The decoys are realistic looking but fake birds, which are placed in the habitat. The decoys have a tendency of attracting fowl, which naturally prefer to be in locations already occupied by others of their kind.

Painstaking care is often given to provide the decoy with a realistic appearance from afar. However, most fowl are smart enough to quickly determine that what looks like a brother, is actually an inanimate object. Thus, the bird decides to "touch and go", rather than land, relax, and give the hunter an opportunity.

U.S. Pat. No. 5,279,063 to Heiges discloses a wild game decoy with a flexible neck, and other flexible appendages. The neck is hinged at two points, which allows the decoy to be pre-posed by the hunter, so that multiple decoys may be deployed, each pre-posed in a different position. Heiges is aimed at providing varying appearance between decoys in a "fake flock". Heiges does not disclose a decoy in which the appendages are adapted to move on their own.

U.S. Pat. No. 4,972,620 to Boler discloses a aerodynamic movable wild game decoy. Boler has a mounting stake for placing the decoys in feeding or sentinel positions.

U.S. Pat. No. 4,852,288 to Payne et al. discloses a game decoy which simulates a large game animal, such as a deer, in which the neck is hingeably attached to the main body. A pair of opposing elastic bands are attached to the head to permit oscillating motion of the head.

U.S. Pat. No. 5,274,942 to Lanius discloses a decoy which includes a movable head and a hollow body. The head is hingeably attached to the body, and is weighted to bias the head toward a raised position. A line is indirectly connected to the head, through the body, and may be used by the hunter to remotely move the head.

While these units may be suitable for the particular purpose employed, or for general use, they would not be as suitable for the purposes of the present invention as disclosed hereafter.

SUMMARY OF THE INVENTION

It is an object of the invention to produce a decoy having an life-like appearance that attracts other fowl to land, to give hunters an opportunity at ensnaring them.

It is another object of the invention to provide a decoy that appears to move in the wind, or due to water currents. The neck is attached to the body such that it permits the head to continuously move. The neck is a bipartite construction, wherein the halves are joined solely by a flexible member.

It is a further object of the invention that oscillation of the neck is continuous, even in low wind and water current situations. Thus, the flexible member joining the neck halves comprise at least one spring.

It is a still further object of the invention that oscillation is slightly random, and not completely consistent. The use of two springs for the flexible member ensures a complex oscillation pattern.

The invention is a decoy, for providing the appearance of a realistic living bird, comprising a main body, a head, and a bi-partite neck comprising an upper neck and lower neck. The upper neck adjoins the head, and lower neck adjoins the main body. A flexible member extends between the upper neck and lower neck. The flexible member comprises an upper coil spring and lower coil spring. The dual coil springs allow the head to oscillate in a complex pattern, without manual intervention, to provide the appearance of a living bird to other birds in the vicinity.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a side elevational view, illustrating a decoy according to the present invention.

FIG. 2 is a cross sectional view, taken generally in the direction of line 2—2 in FIG. 1.

FIG. 3 is a side elevational view, illustrating movement of the head between various positions.

DETAILED DESCRIPTION OF THE PREFERRED EMBODIMENTS

FIG. 1 illustrates a decoy 10 formed generally in the shape of bird such as a duck, goose, or the like. The decoy 10 comprises a main body 12, a head 14, and a neck 16. The neck 16 is a bi-partite construction, comprising a lower neck 18 and an upper neck 20. The lower neck 18 adjoins the main body 12, and the upper neck 20 adjoins the head 14. The lower neck has an L-shaped bend, such that the head 14 is pointed slightly downward.

The upper neck 20 and lower neck 18 are joined with a flexible member 22. The flexible member is capable of supporting the weight of the head 14, and maintaining the head in a normal position, wherein the upper neck 20 and lower neck 18 are substantially parallel. However, the flexible member also permits and regulates oscillatory, or periodic movement of the head 14 with respect to the body. The flexible member allows such oscillation to be initiated with only minimal force, such as that supplied by the wind or by a water current exerting a force on the main body 12 that is contrary to the inertia of the head 14.

Referring to FIG. 2, ideally the flexible member 22 comprises an upper spring 24 and lower spring 26. The upper spring 24 and lower spring 26 are both coil springs, which produce the oscillation properties of the flexible member 22. The selection of the particular coil springs for the upper spring 24 and lower spring 26 is in accordance with the goals previously described: supporting the weight of the head 14; maintaining the head 14 in a stable position wherein the upper neck 20 and lower neck 18 are substantially parallel; while allowing oscillation to be initiated with a minimal force. Such selection is well known to those skilled in the art, and can be accomplished without undue experimentation.

The use of both an upper spring 24 and a lower spring 26 allows a complex oscillation pattern to develop, other than a simple "bobbing" which would occur if a single spring were used. Thus, a complex pattern of movement of the head 14 can develop, which gives the decoy 10 a more natural appearance to real birds, so that they feel more comfortable landing near the decoy. The complexity of the pattern of movement can be increased and further randomized by employing two different type springs for the upper spring 24 and lower spring 26, each having different spring properties.

Referring to FIG. 3, the head 14, the upper spring 24 and lower spring 26 allow the head 14 to oscillate between alternate positions 14P, without the need for manual manipulation.

It should be noted that the inventive combination can be achieved by modification of existing decoys. Such modification would involve severing the neck of the decoy, and inserting brackets to both pieces at the point of seperation, and then inserting the upper and lower spring between the brackets. In addition, interchangeability of the heads can be provided by removing the head at the upper spring and lower spring.

In conclusion, herein is presented a decoy in which the head is connected to the body with a bi-partite neck. The upper spring and lower spring in the neck allow the head to continually oscillate between various alternate positions, to give the decoy a more natural appearance.

What is claimed is:

1. A decoy, providing the overall appearance of a bird, comprising:

a main body;

a head;

a bi-partite neck comprising an upper neck and lower neck, the upper neck adjoining the head, and the lower neck adjoining the main body; and a flexible member comprising an upper coil spring and a lower coil spring, between the upper neck and lower neck, the flexible member allowing the head to oscillate between various positions without manual intervention.

2. The decoy as recited in claim 1, wherein the lower neck has an L-bend.

3. The decoy as recited in claim 1, wherein the upper spring and lower spring have different spring properties.

* * * * *